United States Patent Office 3,535,248
Patented Oct. 20, 1970

3,535,248
STABILIZED NITROCELLULOSE LATICES
Mark Plunguian, Newark, Del., assignor to Hercules Incorporated, Wilmington, Del., a corporation of Delaware
No Drawing. Filed Feb 19, 1968, Ser. No. 706,694
Int. Cl. C08b 21/14
U.S. Cl. 260—17           1 Claim

ABSTRACT OF THE DISCLOSURE

Nitrocellulose latices are stabilized by a nonionic stabilizer comprising a high molecular weight compound containing a hydrophobic portion which is nitrocellulose soluble and a hydrophilic portion having a molecular weight of at least 1000, used in conjunction with a conventional nonionic surfactant.

---

This invention relates to the preparation of stable dispersions of nitrocellulose particles in water.

Nitrocellulose has been used for many years as a coating and film-forming material for coating wood, paper, cloth, and other substrata. Originally these films were laid down from lacquers in a volatile solvent such as a low molecular weight ketone or ester. More recently, however, it has been found preferable to apply the coating as a water dispersion or hydrosol of plasticized small particles, followed by heating to drive off the water and coalesce the particles. This latter technique is characterized, among other things, by greater ease of handling due to use of dispersions rather than viscous solutions, greater safety due to elimination of volatile solvents, and more favorable economics since no solvent need be recovered.

The hydrosol compositions are usually prepared by stripping the solvent from an aqueous emulsion of a nitrocellulose lacquer. In this technique an ordinary nitrocellulose lacquer is emulsified in water and subjected to vigorous, high shear agitation in the presence of suitable surface active agents until a homogeneous emulsion of very tiny lacquer droplets is formed. This is then stripped of solvent under vacuum, leaving behind a suspension of nitrocellulose particles which are maintained in suspension in the water by the same surface active active agent that was used to emulsify the lacquer initially.

In the past, anionic surface active agents have been preferred for the preparation of the above described lacquer emulsions and latices or hydrosols. It is believed that an effective emulsifier must meet at least two basic requirements. First, it must have a relatively high hydrophilic-lyophilic balance (HLB), say about 16 or higher, by virtue of which it can reduce the interfacial tension between the lacquer and the water phases, facilitating the shearing of the lacquer phase into the required fine droplets from which fine particle latices result. Second, the emulsifier must create the correct electrical environment around the droplets and particles so that there is a mutal repulsion between droplets to prevent coalescence thereof or between solid particles to prevent clustering.

The terms "emulsifier" and "surfactant" are used interchangeably in this specification. Generally emulsifier is used to describe a surface active agent when used to suspend a liquid and surfactant to describe the same material when used to suspend a solid. The term "stabilizer" is used to denote a material as described hereinafter, which has certain of the properties of a surfactant, but which has a higher molecular weight and which is used in conjunction with a surfactant to increase the stability of a dispersion to settling.

The anionic emulsifiers or surfactants which have been employed in the past in lacquer emulsions and latices have met both of these needs very well. In patricular, materials such as sodium ammonium sulfates of hydroxyethylated nonylphenols have been found very effective and have been used extensively.

However, a serious problem associated with the use of anionic surfactants has recently been encountered. It has been found that the thermal stability of nitrocellulose coatings and other structures prepared from latices containing anionic surfactants leaves much to be desired. For example, upon exposure at 110° C. for 5 minutes, films prepared from such latices discolor bady from clear and transparent to a dark brown color. Further, upon treatment by the standard "German" heat stability test at 134.5° C., these materials fired after only 14 minutes. By contrast, films and other structures from nitrocellulose, where no surfactant is employed, did not discolor at all by the first test and withstood better than 5 hours in the "German" test without firing.

It has now been established that this thermal instability in the nitrocellulose is reated to the use of anionic surfactants in the latices. For reasons which have not been clearly explained, the presence of the cationic moiety of the surfactants, i.e., $Na^+$, $K^+$, $NH_4^+$, or the like is the cause. When nonionic surfactants or those containing a free acid group are used, the discoloration and premature firing were not experienced.

Nonionic surfactants, however, present a different problem. These materials do not perform as well as necessary in the second of the two basic requirements set forth above. That is to say, they are effective emulsifiers for the lacquer emulsions but they do not satisfactorily stabilize the dispersion of particles after removal of the lacquer solvent. This instability is manifest either in a limitation in the concentration of dispersed nitrocellulose attainable or in an intolerable amount of settling of particles upon standing of the latex.

In accordance with this invention it has been found that stable plasticized nitrocellulose hydrosols or latices containing about 10 to 65% nitrocellulose can be prepared, based on nonionic surfactant systems, if, in addition to the nonionic surfactant, there is present in the latices a minor proportion of a water soluble nonionic dispersion stabilizer meeting certain qualifications.

The nonionic surfactant which is employed in the compositions of this invention can be any polymeric, water soluble nonionic surfactant having HLB of 14 or higher. The identification of this component is not believed to be critical. Effective materials for this purpose are the alkylphenoxypoly(ethylene oxides) such as, e.g., nonylphenoxypoly(ethyleneoxy)$_n$ ethanol, and octylphenoxypoly(ethylenoxy)$_n$ ethanol and other alkylphenoxypolyethyleneoxy) ethanols where $n$ is at least 50.

The surfactant is usually employed in concentrations of about 1 to 10% based on the weight of nitrocellulose in the dispersion.

The nonionic stabilizer is comprised of a hydrophobic portion which is soluble in, or miscible with, dispersed nitrocellulose particles and, attached thereto, a hydrophilic group having a molecular weight of at least 1000 and preferably at least about 2000. The hydrophobic portion of the stabilizer can be an ester group or a polyoxypropylene. The hydrophilic group having molecular weight of 1000 or more is preferably a poly(alkyleneoxy)alkanol or modified poly(alkyleneoxy)alkanol group. The preferred alkyleneoxy alkanol groups are those based on ethylene oxide. Examples of such useful stabilizers include hydroxyethylated castor oil fatty acid glycerides having 150 to 200 moles of ethylene oxide and hydroxyethylated hydroxypropylene with 150 to 300 moles ethylene oxide. Other useful stabilizers can be prepared by reacting polyelectrolytes with nonionic emulsifiers based on polyoxyetheylenes which otherwise would not have sufficient chain length to function as stabilizers. Effective stabilizers of this type can be prepared by reacting poly-(methylvinyl ether-maleic anhydride) with polyoxyethylene sorbitan monolaurate, or styrene-maleic anhydride copolymer with a hydroxyethylated hydroxypropylene, or by grafting an acrylic ester to poly(ethylene oxide).

One form of stabilizer which has been found particularly effective is the reaction product of poly(methyl vinyl ether-maleic anhydride) with polyoxyethylene sorbitan monolaurate. Useful products of this type can be prepared by reaction of 97.5 to 67 parts by weight of the copolymer with 2.5 to 33 parts of the ester. The reaction is conducted in aqueous medium at relatively low temperatures whereby the maleic anhydride units are hydrolyzed to free acid, which, in turn reacts with free hydroxyl groups on the polyoxyethylene sorbitan monolaurate. The resulting adduct is quite soluble in water, forming highly viscous solutions.

These stabilizers are usually effective in relatively low concentrations. Amounts of about 0.5 to 3% by weight based on weight of the nitrocellulose are usually sufficient. Larger amounts are not harmful, but no further improvement can be realized from larger amounts. The lowest possible concentration is usually employed for economic reasons.

In the following examples, several embodiments of the invention are illustrated. Parts and percentages are by weight unless otherwise indicated.

EXAMPLE 1

To 500 parts of water at 85° C. there was added 2.0 parts of polyoxyethylene sorbitan monolaurate, which was agitated until complete solution was effected. There was then added, with continued agitation, 76 parts of poly(methyl vinyl ether-maleic anhydride) resin having a specific viscosity of about 1.2. After about 5 minutes the solution became so viscous that agitation was difficult. At this point 330 additional parts of water was added, and agitation and heating were continued for 20 minutes. The solution was then cooled to room temperature. It contained 8.6% nonvolatiles, had viscosity of 130 centipoises and a pH of 2.0.

EXAMPLE 2

In 150 parts of water, there was dissolved, with agitation, 0.9 part of polyoxyethylene sorbitan monolaurate, followed by 34 parts of poly(methyl vinyl ether-maleic anhydride) resin having specific viscosity of about 0.3. This solution became extremely viscous after about 5 minutes whereupon an additional 50 parts of water was added. Heating and agitation were continued for 20 minutes thereafter, then the solution was cooled. The resulting solution had 15% nonvolatiles, viscosity of 140 centipoises and pH of about 1.8.

EXAMPLE 3

To 500 parts of water, there was added, with agitation, 19 grams of polyoxyethylene sorbitan monolaurate, and 38 grams of poly(methyl vinyl ether-maleic anhydride) resin having specific viscosity of about 1.7. As in previous examples, the solution became very viscous after about 5 minutes stirring. Another 25 parts of water was added at this point and heating was continued for another 20 minutes. Upon cooling to room temperature, the solution contained 9.8% nonvolatiles, had a pH of 2.8. The solution was still extremely viscous, almost a gel.

EXAMPLE 4

A nitrocellulose solution was prepared by dissolving 639 parts of water-wet (70.5% NC) nitrocellulose (½ sec. viscosity) and 50 parts of butyl benzyl phthalate in 1000 parts of isopropyl acetate. This was emulsified by adding slowly and with vigorous agitation 10 parts of a 50% water solution of poly(hydroxyethyl)$_{100}$ nonylphenol, and when this was completely mixed in, 850 parts of water. The water was added slowly with good mixing so that inversion of the W/O emulsion did not take place. The emulsion was then inverted to O/W by adding, with stirring, 30 parts of a 50% solution of the poly(hydroxyethyl)$_{100}$ nonylphenol, 58 parts of the stabilizer of Example 1 and an additional 150 parts of water.

The above emulsion was then homogenized twice in a standard commercial laboratory-type homogenizer at 3500 p.s.i. and a temperature of about 55 to 60° C. Solvent and excess water were removed by vacuum distillation at about 30° C. until a dispersion containing about 54% nonvolatiles remained. After cooling, this dispersion screened readily through a 325 mesh screen. To this was added 24 parts of ethylene glycol as an anti-freeze and 0.1 part of 3,5-dimethyl tetrahydro-1,3,5,2H-thiadiazine-2-thione as an anti-fungus preservative.

This dispersion remained stable on storage for a period of several weeks. A portion of another dispersion, prepared in the same manner but without including the stabilizers could not be concentrated to greater than about 48% solids and, on storage, the solids settled to a hard cake.

The dispersed particles of the thus-prepared hydrosol had a nitrocellulose to plasticizer ratio of about 90/10. This ratio was decreased in a portion of this dispersion by adding 25.5 parts of an emulsion of 17 parts butyl cellosolve acetate and 0.7 part of poly(hydroxyethyl)$_{100}$ nonylphenol and stirring. The solids content of the resultant hydrosol was about 56.3%.

When this hydrosol was applied to a substrate and dried at 80° C., a clear, water white film was formed. After heating for 5 minutes at 110° C., this film showed very little evidence of yellowing.

EXAMPLE 5

A nitrocellulose lacquer was prepared by dissolving 644 parts of water-wet (6 sec. viscosity, 12% nitrogen) nitrocellulose (69.9% NC), and 50 parts butyl benzyl phthalate in 2000 parts of isopropyl acetate. This was emulsified with 1650 parts of water using 10 parts of a 50% solution of poly(hydroxyethyl)$_{100}$ nonylphenol and proceeding as described in Example 4 using the stabilizer of Example 1. The emulsion was homogenized and stripped under vacuum to 54.0% solids. The nitrocellulose to plasticizer ratio of the particles of this dispersion was 90/10.

To the above dispersion was added with stirring 95 parts of an emulsion of 62.5 parts butyl benzyl phthalate emulsified with 3.1 parts of poly(hydroxyethyl)$_{100}$ nonylphenol whereby the nitrocellulose to plasticizer ratio was reduced to 80/20. This was further reduced by adding, to 99 parts of the dispersion, 26.6 parts of an aqueous emulsion containing 0.8 part of poly(hydroxyethyl)$_{100}$ nonylphenol and 16.7 parts of tributoxy ethyl phosphate. This dispersion exhibited a high degree of stability to storage and formed clear films when employed as a coating composition.

EXAMPLE 6

Example 4 was repeated using the stabilizer of Example 2. Equivalent results were achieved.

EXAMPLE 7

A nitrocellulose lacquer emulsion was prepared by dissolving 647 parts of water-wet nitrocellulose (69.5% NC, 12% nitrogen, 5 sec. viscosity) and 50 parts butyl benzyl phthalate in 2000 parts of sec-butyl acetate. This was emulsified by adding, slowly with stirring, 10 parts of a 50% solution of poly(hydroxyethyl)$_{100}$ nonylphenol, followed by 1000 parts of water, then an additional 30 parts of the 50% emulsifier solution. This was agitated to incorporate the ingredients and 5 parts of a stabilizer comprised of about 1750 molecular weight hydroxyethylated polyhydroxypropylene containing about 160 moles of ethylene oxide per mole was added along with an additional 200 parts of water. This emulsion was homogenized at 3500 p.s.i. and the sec-butyl acetate removed by heating under vacuum.

To the dispersion remaining after solvent removal was added 95 parts of a plasticizer emulsion in water containing 62.5 parts of butyl benzyl phthalate dispersed with 3.1 parts of poly(hydroxyethyl)$_{100}$ nonylphenol. The resultant dispersion had nitrocellulose/plasticizer ratio of 80/20, and solids content of 62.7%. After storage for 8 days, there was no evidence of the nitrocellulose particles' settling. By contrast, the same formulation, omitting the stabilizer, exhibiting a substantial amount of settling after sitting overnight.

EXAMPLE 8

A lacquer emulsion was prepared substantially as described above by dissolving 639 parts of water-wet nitrocellulose (70.5% NC, ½ sec. viscosity, 12% nitrogen) and 50 parts of butyl benzyl phthalate in 1000 parts of isopropyl acetate. To this lacquer was added 5 parts of ethoxylated castor oil fatty acid glyceride (~200 moles ethylene oxide). The lacquer was then emulsified by adding 500 parts water, followed by 40 parts of a 50% aqueous solution of poly(hydroxyethyl)$_{100}$ nonylphenol and 500 more parts of water. The emulsion was homogenized, then stripped of solvent to 48% solids.

The resulting dispersion screened easily and exhibited substantially no settling after 5 days' storage.

The stabilizers of the invention are useful with nitrocellulose dispersions generally. Preferably such dispersions are prepared by the emulsion stripping technique discussed above. However, such dispersions can be made by other means. For example, U.S. Pat. 3,198,645 teaches preparation of small particle dispersions by ball milling in the presence of water or an alkanol. Stability of dispersions prepared in this manner can also be improved by using the stabilizers of this invention.

What I claim and desire to protect by Letters Patent is:

1. A stabilized, substantially solvent-free nitrocellulose hydrosol comprising as a dispersed phase, particulate, plasticized nitrocellulose and as a continuous phase, water containing 1 to 10% based on nitrocellulose, of a nonionic surfactant and about 0.5 to 3% based on nitrocellulose of a water-soluble nonionic dispersion stabilizer, said nonionic dispersion stabilizer comprising a reaction product of about 67 to 97.5 parts by weight of poly(methyl vinyl ether-maleic anhydride) resin having specific viscosity of about 0.3 to 2.0 with 33 to 2.5 parts by weight of polyoxyethylene sorbitan monolaurate, said dispersed phase comprising about 10 to 65% by weight of the total hydrosol.

References Cited

UNITED STATES PATENTS

| | | | |
|---|---|---|---|
| 2,677,672 | 5/1954 | Luce | 260—29.6 |
| 2,792,314 | 5/1957 | Brown | 106—170 |
| 2,843,583 | 7/1958 | Voris | 260—223 |
| 2,965,590 | 12/1960 | Schumacher et al. | 260—23 |
| 3,161,623 | 12/1964 | Kuhne | 260—17 |
| 3,306,863 | 2/1967 | Leitner | 260—17 XR |
| 3,421,919 | 1/1969 | Lin | 106—170 |

WILLIAM H. SHORT, Primary Examiner

L. M. PHYNES, Assistant Examiner

U.S. Cl. X.R.

260—23, 29.6, 31.2